July 23, 1968     A. R. REDSELL     3,393,894
BLADE ASSEMBLY
Filed Dec. 5, 1966
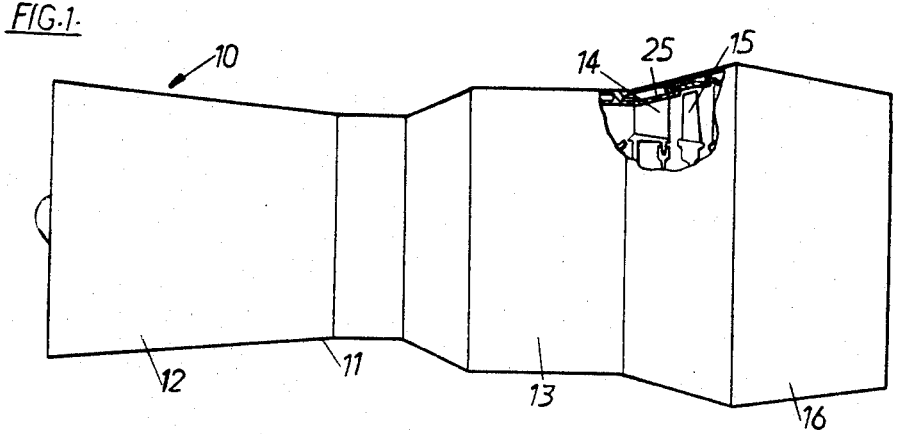
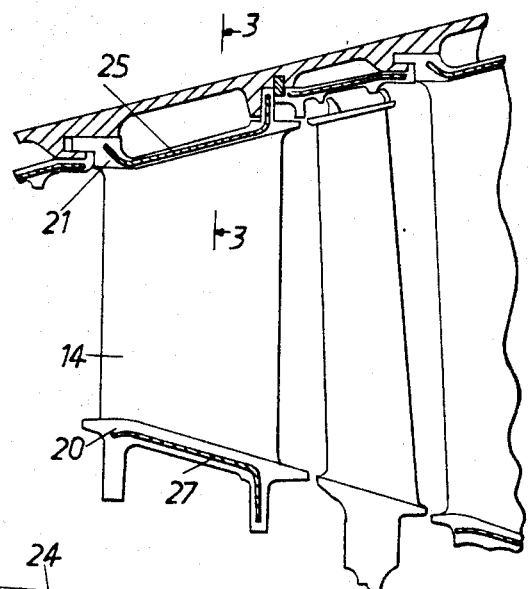
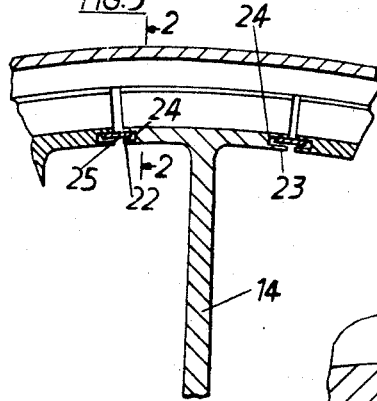
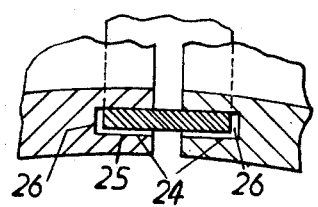
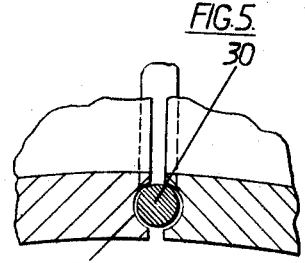

United States Patent Office 3,393,894
Patented July 23, 1968

3,393,894
BLADE ASSEMBLY
Arthur Rickards Redsell, Colne, England, assignor to Rolls-Royce Limited, Derby, England, a British company
Filed Dec. 5, 1966, Ser. No. 599,279
Claims priority, application Great Britain, Dec. 28, 1965, 54,951/65
5 Claims. (Cl. 253—78)

ABSTRACT OF THE DISCLOSURE

A blade assembly for a gas turbine engine has arcuate sealing members partly received in, and mounted between, slots in the side faces of adjacent platform and/or shrouds to seal the gap therebetween.

---

This invention concerns a blade assembly for a fluid flow machine, such, as a gas turbine engine.

According to the present invention, there is provided a blade assembly for a fluid flow machine such as a gas turbine engine comprising a row of angularly spaced apart aerofoil-shaped stationary blades, and sealing members extending between platforms and/or shrouds of adjacent blades of said row to prevent the passage of gas therebetween, each sealing member being mounted in slots in the sides of the adjacent platforms or shrouds.

The term "blades" is used in this specification in a broad sense as including, for example, not only turbine blades but also nozzle guide vanes.

Each sealing member may be mounted in the slots with clearances to permit for expansion of the blades.

Each slot preferably extends throughout the major part of the axial length of the platform or shroud.

The lengthwise profile of at least part of each sealing member may be similar to that of the platforms or shrouds in which the said part is received.

The sealing members may be sheet metal members, in which case the said slots are substantially rectangular in section. Alternatively, the sealing members may be wire members in which case the said slots are substantially semi-circular in section.

The invention also comprises a gas turbine engine provided with at least one blade assembly as set forth above.

The invention is illustrated, merely by way of example, in the accompanying diagrammatic drawings, in which:

FIGURE 1 is a view, partly in section, of a gas turbine engine provided with blade assemblies in accordance with the present invention, FIGURE 2 is a broken-away sectional view showing part of the structure of FIGURE 1 on a larger scale, FIGURE 2 being a section on the line 2—2 of FIGURE 3, FIGURE 3 is a broken-away section taken on the line 3—3 of FIGURE 2, FIGURE 4 is a broken-away sectional view showing part of the structure of FIGURE 3 on a larger scale, and FIGURE 5 is a sectional view similar to that of FIGURE 4, but illustrating a modification.

In FIGURE 1 there is shown a gas turbine engine 10 having an engine casing 11 in which there are mounted, in flow series, a compressor 12, combustion equipment 13, a plurality of angularly spaced apart aerofoil-shaped nozzle guide vanes 14, and a turbine 15 which drives the compressor 12, the turbine exhaust gases being directed to atmosphere through an exhaust duct 16.

Each of the nozzle guide vanes 14 has a platform 20 and a shroud 21.

Each of the oppositely disposed axially extending sides 22, 23 of each nozzle guide vane 14 has a slot 24 machined therein which is substantially rectangular in section and which extends throughout almost the whole of the axial length of the shroud 21. The slots 24 of the adjacent shrouds 21 are aligned, and mounted in each pair of such aligned slots 24 is a sheet metal sealing member 25. As will be seen from FIGURE 2, the profile of the major part of each sheet metal sealing member 25 is similar to that of the shroud 21 in which the said major part is received.

The sealing members 25 are mounted in their slots 24 with small clearances 26 to permit for expansion of the nozzle guide vanes 14.

The platforms 20 are similarly provided with sheet metal sealing members 27, each of which is mounted in aligned slots in the sides of the adjacent platforms.

The provision of the sealing members 25, 27 will thus prevent the passage of gas radially outwardly or radially inwardly between adjacent nozzle guide vanes 14, whereby the efficiency of the engine will be improved. The sealing members 25 may be bent slightly in a transverse plane (that is, the plane of FIGURE 4) in order to improve the mechanical sealing efficiency.

Alternatively, instead of providing sheet metal sealing members 25, sealing members 30 may be provided, as shown in FIGURE 5. The sealing members 30 are formed of wire and are received in slots 31 in the platforms 20 and shrouds 21, the slots 31 being substantially semi-circular in section, As will be seen from FIGURE 5, the sealing members 30 are received in their slots 31 with some small clearances to permit for expansion of the adjacent nozzle guide vanes 14.

I claim:

1. A stator blade assembly for a fluid flow machine such as a gas turbine engine comprising a plurality of angularly spaced apart radially extending aerofoil-shaped blades, a shroud and a platform provided on each of said blades, each said shroud and platform having radially extending side faces with slots therein, sealing members being partly received in, and mounted between, respective said slots in opposing faces of the shrouds and platforms of adjacent blades to seal the gap therebetween, said sealing members extending throughout the major part of the axial length of the shroud and platform, said sealing members being bent in the radial direction and mounted in slots, which have substantially the same profile as the sealing members, with clearances to permit expansion of the blades.

2. A stator blade assembly as claimed in claim 1, wherein said sealing members are sheet members.

3. A blade assembly as claimed in claim 1 in which the sealing members are sheet metal members, the said slots are substantially rectangular in section.

4. A blade assembly as claimed in claim 1 in which the sealing members are wire members, the said slots being substantially semi-circular in section.

5. A blade assembly as claimed in claim 1 in which the blades are nozzle guide vanes.

References Cited

UNITED STATES PATENTS

| 1,423,466 | 7/1922  | Snyder         | 253—77 |
|-----------|---------|----------------|--------|
| 2,220,918 | 11/1940 | Smith          | 253—77 |
| 2,310,412 | 2/1943  | Flanders       | 253—77 |
| 2,651,496 | 9/1953  | Buckland et al.| 253—78 |
| 3,004,750 | 10/1961 | Broders        | 253—78 |
| 3,295,825 | 1/1967  | Hall           | 253—78 |
| 2,638,743 | 5/1953  | Feilden.       |        |
| 2,857,132 | 10/1958 | McDowall.      |        |
| 2,859,934 | 11/1958 | Halford et al. |        |

EVERETTE A. POWELL, JR., *Primary Examiner.*